Patented July 12, 1938

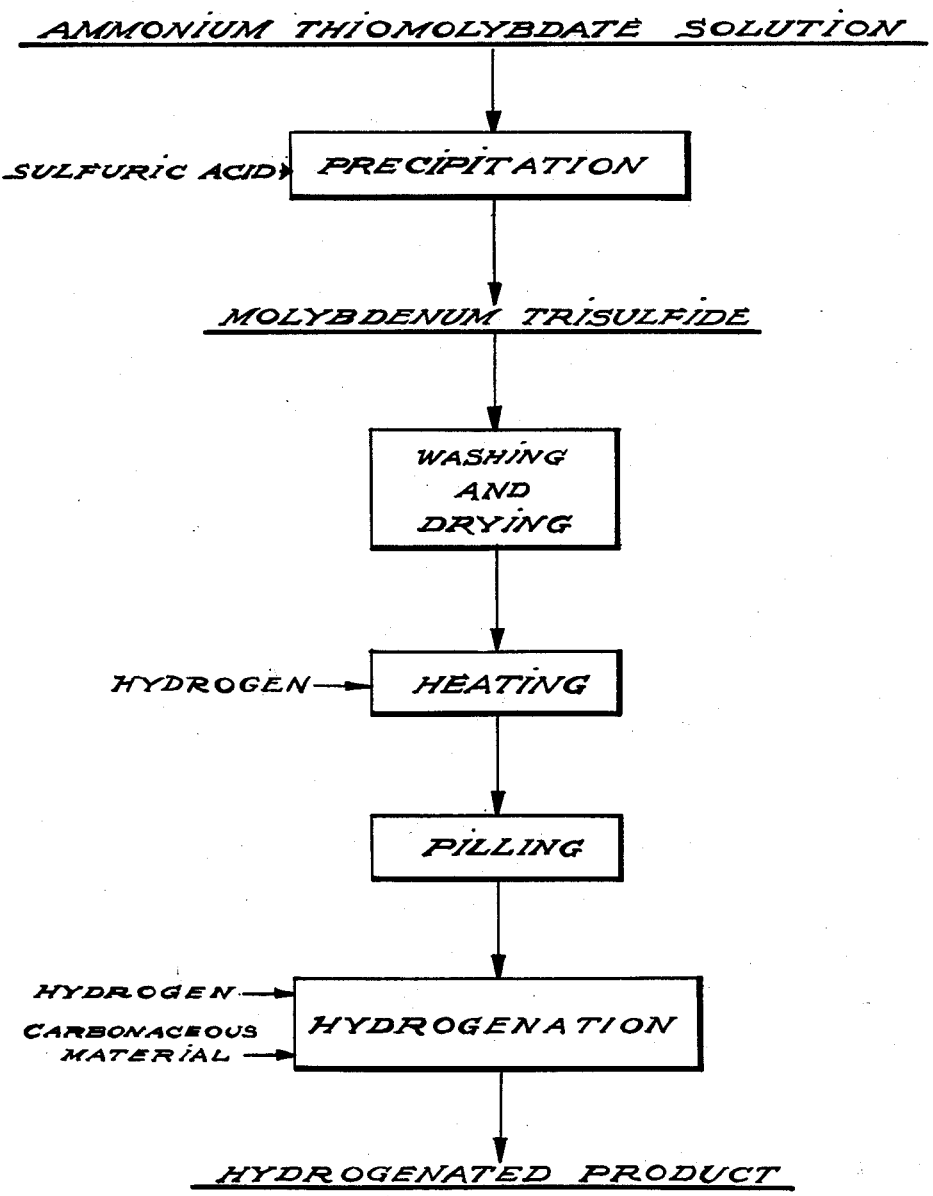

2,123,623

UNITED STATES PATENT OFFICE 2,123,623

HYDROGENATION CATALYST AND METHOD OF PREPARATION AND USE

Cecil L. Brown, Baton Rouge, La., assignor to Standard-I. G. Company

Application June 14, 1934, Serial No. 730,643

11 Claims. (Cl. 196—53)

This invention relates to improved catalysts particularly suitable for hydrogenation reactions and to improved methods for the production of such catalysts, and to the use of such catalysts in hydrogenation reactions generally.

This invention relates more particularly to catalysts prepared by the precipitation of polysulfides of metals of Groups V, VI and VII of the Periodic System, from suspensions and/or solutions of compounds of these metals and to the treatment of precipitates thus obtained.

It has already been proposed to use as catalysts, the polysulfides of metals of Groups V and VI of the Periodic System and to prepare these polysulfides by thermal decomposition of thiosalts of the metals, as by heating ammonium thiomolybdate, or by treating the metals or compounds thereof, such as the oxides, with sulphidizing agents under conditions permitting intensive reaction, such as the use of hydrogen sulfide at an elevated temperature.

It has now been found that catalysts having much greater activity and longer life than those described above may be prepared by forming polysulfides of metals of groups V, VI and VII in the wet way; i. e., by precipitation of polysulfides from solutions of compounds of these metals or by conversion of aqueous suspensions of compounds of these metals into polysulfides, and by subsequently treating such polysulfides so as to increase their suitability for use as catalysts. Such polysulfides, formed in the wet way, are termed "precipitated" polysulfides for the purpose of this invention. The precipitated polysulfides are preferably freed from any undesirable impurities and catalyst poisons which may be present and are heated in a non-oxidizing atmosphere to a temperature preferably above about 375° C. and approximating the temperature of the reaction in which the catalyst is to be used, and the so-treated material is then put into suitable shapes or forms such as pills, briquettes, cubes, rods, etc., for use as catalysts in the desired reaction. The catalyst is preferably maintained continuously in a non-oxidizing atmosphere following the heating treatment. The catalyst may also be suspended in material to be subjected to the desired reaction, for example an oil to be hydrogenated, and then subjected to the heat treatment therein. The catalyst may also be prepared in a powdered or colloidal form after the heating stage for suspension in oils to be hydrogenated.

The drawing is a diagrammatic illustration of one embodiment of the invention and indicates the sequence of steps in the preparation and use of a molybdenum catalyst as described in the following Examples 1 and 3.

The following examples are presented to illustrate methods suitable for the preparation and use of catalysts according to the herein described invention.

*Example 1.*—144 grams of molybdenum trioxide is slowly added to and dissolved in 1500 c. c. of an aqueous solution of ammonium sulfide containing about 12% hydrogen sulfide and about 8% ammonia by weight, the temperature being maintained below about 60° C. throughout the period of solution. 1600 c. c. of an aqueous solution containing about 25% of sulfuric acid is then added to the resulting solution of ammonium thiomolybdate and molybdenum trisulfide is thereby precipitated. The precipitate is washed well with water by decantation to remove water soluble impurities such as sulfates and is then filtered and partially dried with steam with the exclusion of air. The precipitate is then heated in a stream of hydrogen to about 427° C. and the precipitated trisulfide is converted to a lower sulfide. The color of the precipitated trisulfide changes from brown to black and the structure changes from a soft amorphous powder to granular particles of crystalline form during this conversion. The resulting product is a highly active hydrogenation catalyst and may be used for extended periods of time without decrease in activity.

*Example 2.*—144 grams of molybdenum trioxide are slowly dissolved in 600 c. c. of an aqueous solution of ammonium sulfide containing about 12% hydrogen sulfide and about 8% ammonia by weight, the temperature being kept below about 60° C. The resulting solution is cooled to about 20° C. and is then saturated with hydrogen sulfide. The ammonium thiomolybdate is then treated with acid to form a precipitate of molybdenum trisulfide which is washed and heated, as described in Example 1, to produce a catalyst of similar properties.

It is desirable, in preparing the solution of ammonium compounds of molybdenum, to use temperatures sufficiently high to cause solution to proceed at a good rate and to avoid temperatures causing the evolution of ammonia or hydrogen sulfide from the solution in any great quantities. It is preferable in the conversion of ammonium molybdate to ammonium thiomolybdate to use low temperatures to aid the solution of hydrogen sulfide. The temperature is preferably not low enough to cause substantial crystallization of ammonium thiomolybdate. It is also preferable to conduct this step under super-atmospheric pressures of hydrogen sulfide in order to increase the rate of solution and the amount of hydrogen sulfide in the solution. It is preferred that the concentrations of the various reagents be so adjusted that at least the major portion of the ammonium thiomolybdate formed remains in solution until the precipitation step. More dilute solutions may be used if desired. It is generally preferable to provide cooling means to remove the heat evolved on the addition of acid sufficiently to avoid boiling of the liquid. The acid used may be of any desired strength and may even be concentrated. Other acids, such as hydrochloric, nitric, acetic and phosphoric acids, may be used in partial or complete substitution for sulfuric acid in the precipitation step. The liquor from which the precipitated molybdenum trisulfide is separated may be subjected to any suitable treatment for the recovery of ammonia or hydrogen sulfide or both, and these recovered reagents may be recycled with or without addition of fresh reagents to the solution step where they are contacted with additional molybdic oxide and/or with undissolved excess molybdic oxide from a prior solution step.

While particular methods have been described for the production of a solution of ammonium thiomolybdate from which molybdenum trisulfide may be precipitated by acidification, it is understood that this invention is not to be limited to the use of such method. Any other method suitable for preparing a precipitate of molybdenum trisulfide may be used, and in fact any method may be used by which a polysulfide of molybdenum is precipitated from a solution or suspension of any compound of molybdenum. For example, an aqueous suspension containing finely divided particles of ammonium thiomolybdate may be treated with acid as described above and a precipitate of molybdenum trisulfide is thereby obtained.

The precipitated molybdenum polysulfide may be used directly as a hydrogenation catalyst. Its catalytic activity is preferably improved by heating the precipitate to a temperature above about 350° to 375° C., at which point the conversion above noted is first observed. The precipitate is preferably heated to at least, and preferably 50 to 100° higher than the temperature of the reaction in which the resulting catalyst is to be used. This temperature may be as high as 550° to 600° C. or even higher. The heating may be conducted in substantially any non-oxidizing atmosphere such as inert gas, nitrogen, hydrocarbon vapors and the like. The precipitate is preferably heated in hydrogen and to a temperature in excess of the reaction temperature in which it is to be used in order to carry the noted conversion in form substantially to completion for the intended reaction conditions. The resulting molybdenum catalyst may then be compressed into pills or other suitable shapes and retains those shapes in use even under conditions of high velocity and elevated temperatures.

This method for preparing improved catalysts may be applied generally to the metals of Groups V, VI and VII of the Periodic System including vanadium, chromium, molybdenum, tungsten, uranium and rhenium.

*Example 3.*—A molybdenum polysulfide catalyst prepared as described in Example 1 is used for the improvement of a petroleum lubricating oil by hydrogenation under conditions permitting limited destructive hydrogenation with the formation of small amounts of low boiling hydrocarbons, such as motor fuel, as follows: A petroleum lubricating oil fraction having a Saybolt viscosity of 141 seconds at 210° F. and a viscosity index of 62 is mixed with an equal volume of a burning oil fraction and is passed with hydrogen through a reaction zone packed with lumps of the catalyst and maintained at a temperature of 371° to 388° C. and a pressure of about 180 atmospheres. The resulting product is fractionated by distillation and yields as a residual fraction a highly improved lubricating oil having a Saybolt viscosity at 210° F. of 110 seconds and a viscosity index of 95.

The best molybdenum catalyst heretofore known required an operating temperature about 18° C. higher and a rate of throughput about 60% lower than that used with the above catalyst to obtain the same yield and quality of product.

*Example 4.*—Cyclohexane is passed in a stream of nitrogen at a temperature of 371° C. over a molybdenum polysulfide catalyst prepared as described in Example 1 and is thereby dehydrogenated to benzene which is obtained in a yield closely approximating 100%.

The catalysts prepared according to the herein described invention will be found highly desirable for promoting hydrogenation, destructive hydrogenation and dehydrogenation reactions generally. These catalysts are particularly suited for the production of refined oils, of high quality lubricating oils, and of low boiling hydrocarbon products such as burning oils and motor fuels from all types of distillable carbonaceous materials such as various kinds of coal, tars, mineral oils, distillation, extraction and conversion products and residues thereof such as are obtained by cracking, limited oxidation, destructive hydrogenation and the like by treating such materials, in the presence of these catalysts, with hydrogenating gases, such as hydrogen, or gases containing hydrogen, preferably at temperatures above about 250° C. and under high pressure.

The catalysts according to the present invention may be employed when working in the solid phase, in the liquid phase, or in the gaseous or vapor phase.

The expression "treatment with hydrogenating gases" of distillable carbonaceous materials is intended to comprise the most varied reactions, and the catalysts employed in accordance with the present invention have been found to be particularly advantageous in all of these said reactions. Thus the expression includes the destructive hydrogenation of carbonaceous materials, such as coal of all varieties, including lignite, other solid carbonaceous materials, such as peat, shales and wood, mineral oils, tars and the distillation, extraction and conversion products thereof, to produce hydrocarbons of all kinds, such as motor fuels and in particular antiknock motor fuels, middle oils, kerosene and lubricating oils. It also includes the treatment of heavy viscous hydrocarbon oils with hydrogen under high pressure at temperatures in the lower portion of the range suitable for destructive hydrogenation permitting the formation of a percentage preferably not above 10 to 15% of light oils boiling below about 200° C. in order to improve the viscosity index and other lubricating characteristics of such oils. The said expression also includes the removal of non-hydrocarbon impurities, such as sulfur or oxygen-containing substances or nitrogen compounds by the action of hydrogen or gases containing or supplying hydrogen from crude carbonaceous materials, for example the refining by treatment with hydrogen of crude benzol, of crude motor fuels or of lubricating oils. The said expression further includes the conversion of oxygen- or sulfur-containing organic compounds to produce the corresponding hydrocarbons or hydrogenated hydrocarbons, for example the conversion of phenols or cresols into the corresponding cyclic hydrocarbons or hydrogenation products thereof. Finally it includes the hydrogenation of unsaturated compounds and more particularly of unsaturated hydrocarbons or of aromatic compounds and more particularly of aromatic hydrocarbons, for example to produce hydroaromatic hydrocarbons.

The said reactions with hydrogen or hydrogen-containing gases are usually carried out at temperatures between 250° and 700° C. and as a rule between 380° and 550° C. The pressures employed are usually in excess of 20 atmospheres and as a rule preferably in excess of 50 atmospheres. In some reactions, however, for example in the refining of crude benzol, rather low pressures, for example of the order of 40 atmospheres may be employed. Generally pressures of about 100, 200, 300, 500 and in some cases even 1000 atmospheres come into question.

The amount of hydrogen maintained in the reaction space, and parts connected therewith if any, varies greatly with the nature of the particular initial materials treated or according to the result in view. In general 1000 to 10,000 cubic feet or more of hydrogen measured under normal conditions of temperature and pressure, per barrel of carbonaceous material treated, may be used.

The gases for use in the reaction may consist of hydrogen alone or of mixtures containing hydrogen (for example a mixture of hydrogen with nitrogen or for example water gas) or of hydrogen mixed with carbon dioxide, sulphuretted hydrogen, water vapour, methane or other hydrocarbons. Or the hydrogen may be generated in the reaction chamber by the interaction of water and coal, carbon monoxide, hydrocarbons and the like.

It is particularly advantageous to operate by continuously introducing fresh carbonaceous material into the reaction vessel and continuously removing products therefrom. If desired several reaction vessels may be employed, in which different conditions of temperature and/or pressure may, if necessary, be maintained and in which different catalysts may also be employed. Sufficiently converted reaction products may be removed after treatment in any one of the reaction vessels. Materials which have not been sufficiently reacted on may be recycled or treated in a further reaction vessel.

The precipitated polysulfides of the metals of Groups V, VI and VII may also be used in admixture with similar polysulfides of one or more other metals of the groups indicated and with any one or more of the metals themselves, their oxides, sulfides prepared by other means, and other compounds of such metals. The precipitated polysulfides may also be used generally as hydrogenation catalysts in admixture with suitable promoters such as oxides of the metals of Groups II, III and IV of the Periodic System, and particularly with oxides and other compounds of magnesium, zinc, aluminum, silicon, cerium and thorium. Such promoters may also be added to the mixtures described in the preceding sentence. The precipitated polysulfides and the mixtures above described may also be used in admixture with suitable carriers or supports, which are preferably in porous form. As carrier any suitable adsorptive or porous substance may be used, such as activated carbon or other finely divided coals, silica gel, alumina gel, or other gels, pumice stone, alundum stone, infusorial earth, bleaching earth, porous clay, silica, magnesite, coke, or the aforesaid elements or suitable compounds thereof, such as the oxides, carbides, silicides, carbonates, borates, sulphates, or sulphides.

This invention is not to be limited by any explanations or examples herein presented, all of which are presented solely for purpose of illustration, but is to be limited only by the following claims in which it is desired to claim all novelty insofar as the prior art permits.

I claim:

1. In the thermal catalytic treatment of distillable carbonaceous materials for varying the hydrogen content thereof, the step of employing a catalyst prepared by precipitating a polysulfide of a metal of Groups V, VI, and VII from an aqueous solution of a compound of said metal, and heating the precipitate in a non-oxidizing gaseous atmosphere at a temperature of about 350 to 600° C. before contact with said carbonaceous material to convert the polysulfide into a lower sulfide of crystalline form.

2. In the treatment of distillable carbonaceous materials with hydrogenating gases at elevated temperature, an improved method of operation comprising conducting said treatment in contact with a catalyst prepared by precipitating a polysulfide of a metal of Groups V, VI, and VII from an aqueous solution of a compound of said metal, and heating the precipitate in a non-oxidizing gaseous atmosphere at a temperature of about 350 to 600° C. before contact with said carbonaceous material to convert the polysulfide into a lower sulfide of crystalline form.

3. In the treatment of distillable carbonaceous materials with hydrogenating gases at elevated temperature, an improved method of operation comprising conducting said treatment in contact with a catalyst prepared by precipitating molybdenum trisulfide from an aqueous solution of a compound of molybdenum, and heating the precipitate in a non-oxidizing gaseous atmosphere at a temperature of about 350 to 600° C. before contact with said carbonaceous material to convert the molybdenum trisulfide into a lower sulfide of crystalline form.

4. Process according to claim 3 in which the said heating step is conducted at a temperature of about 427° C.

5. Process according to claim 3 in which the said heating step is conducted at a temperature of about 375° C.

6. In the treatment of distillable carbonaceous materials with hydrogenating gases at elevated temperature, an improved method of operation comprising conducting said treatment in contact with a catalyst prepared by precipitating molybdenum trisulfide from an aqueous solution of a compound of molybdenum, washing the precipitate with water to remove impurities, and heating the washed precipitate in a non-oxidizing gaseous atmosphere, before contact with said carbonaceous material, to a temperature above about 350° C. but below about 600° C. until a lower sulfide of molybdenum is obtained.

7. In the treatment of distillable carbonaceous materials with hydrogenating gases at elevated temperature, an improved method of operation comprising conducting said treatment in contact with a catalyst prepared by precipitating molybdenum trisulfide from an aqueous solution of an ammonium compound of molybdenum with a strong mineral acid, washing the precipitate with water to remove impurities, and heating the washed precipitate in a non-oxidizing gaseous atmosphere, before contact with said carbonaceous material, to a temperature above about 350° C. but below about 600° C. until a crystalline sulfur compound of molybdenum is obtained.

8. In the treatment of distillable carbonaceous materials with hydrogenating gases at elevated temperature, an improved method of operation comprising conducting said treatment in contact with a catalyst prepared by adding dilute sulfuric acid to an aqueous solution of ammonium thiomolybdate to precipitate a polysulfide of molybdenum, washing the precipitate to remove water soluble impurities and heating the washed precipitate in a non-oxidizing gaseous atmosphere, before contact with said carbonaceous material, to a temperature of above about 350° C. but below about 600° C. until a crystalline sulfur compound of molybdenum is formed.

9. Process according to claim 8 in which the said heating step is conducted at a temperature of about 427° C.

10. Process according to claim 8 in which the said non-oxidizing atmosphere is hydrogen.

11. In the treatment of distillable carbonaceous materials with hydrogenating gases at elevated temperature, an improved method of operation comprising conducting said treatment in contact with a catalyst prepared by saturating an aqueous solution of ammonium molybdate with hydrogen sulfide to form ammonium thiomolybdate, adding a dilute ionized mineral acid to the solution of ammonium thiomolybdate to precipitate a polysulfide of molybdenum therefrom, washing the precipitate to remove impurities and heating the washed precipitate in a non-oxidizing gaseous atmosphere, before contact with said carbonaceous material, to a temperature above about 350° C. but below about 600° C. to form a crystalline sulfur compound of molybdenum.

CECIL L. BROWN.